(12) United States Patent
Mullaney et al.

(10) Patent No.: US 7,925,135 B2
(45) Date of Patent: Apr. 12, 2011

(54) CABLE CLAMPING DEVICES AND METHODS FOR USING THE SAME

(75) Inventors: Julian Mullaney, Raleigh, NC (US); Justin Everette Thompson, Angier, NC (US); William Alan Carrico, Raleigh, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/557,865

(22) Filed: Sep. 11, 2009

(65) Prior Publication Data

US 2010/0054689 A1 Mar. 4, 2010

Related U.S. Application Data

(63) Continuation-in-part of application No. 12/535,946, filed on Aug. 5, 2009.

(60) Provisional application No. 61/093,856, filed on Sep. 3, 2008, provisional application No. 61/122,003, filed on Dec. 12, 2008.

(51) Int. Cl.
  *G02B 6/00* (2006.01)
(52) U.S. Cl. ........................ 385/135; 385/126
(58) Field of Classification Search .................. 385/135, 385/136
See application file for complete search history.

(56) References Cited

U.S. PATENT DOCUMENTS

| | | | |
|---|---|---|---|
| 3,915,540 A | 10/1975 | Thompson et al. | |
| 4,986,761 A | 1/1991 | Gladden, Jr. et al. | |
| 5,590,234 A * | 12/1996 | Pulido | 385/135 |
| 5,684,911 A | 11/1997 | Burgett | |
| 7,270,485 B1 | 9/2007 | Robinson et al. | |
| 2006/0246771 A1 | 11/2006 | Pepe et al. | |

FOREIGN PATENT DOCUMENTS

| | | |
|---|---|---|
| FR | 2 273 386 A | 12/1975 |
| JP | 60067911 | 4/1985 |
| JP | 03167507 | 7/1991 |
| WO | WO 2004/081614 A2 | 9/2004 |
| WO | WO 2005/001533 | 1/2005 |
| WO | WO 2009/029258 A1 | 3/2009 |

OTHER PUBLICATIONS

International Search Report and Written Opinion of the International Searching Authority issued by the European Patent Office on Feb. 4, 2010 for corresponding PCT application No. PCT/US2009/004929.
International Search Report and Written Opinion of the International Searching Authority issued by the European Patent Office on Apr. 1, 2010 for corresponding PCT application No. PCT/US2009/066950.

* cited by examiner

*Primary Examiner* — Mark A. Robinson
*Assistant Examiner* — Jerry Blevins
(74) *Attorney, Agent, or Firm* — Myers Bigel Sibley & Sajovec

(57) ABSTRACT

A closure device for receiving a fiber optic cable includes an enclosure defining a splice chamber configured to accommodate splices to the plurality of optical fibers. The enclosure has a clamp receiving section therein. The closure device further includes a clamping device including a closed end cavity that receives the strength member to limit buckling of a strength member of the cable inserted in the cavity. The clamping device is configured to be removably inserted into the clamp receiving section of the enclosure. The clamp receiving section is configured to fixedly limit movement of the clamping device relative to the enclosure when the clamping device is installed therein to secure the strength member secured in the clamping device to the enclosure.

24 Claims, 14 Drawing Sheets

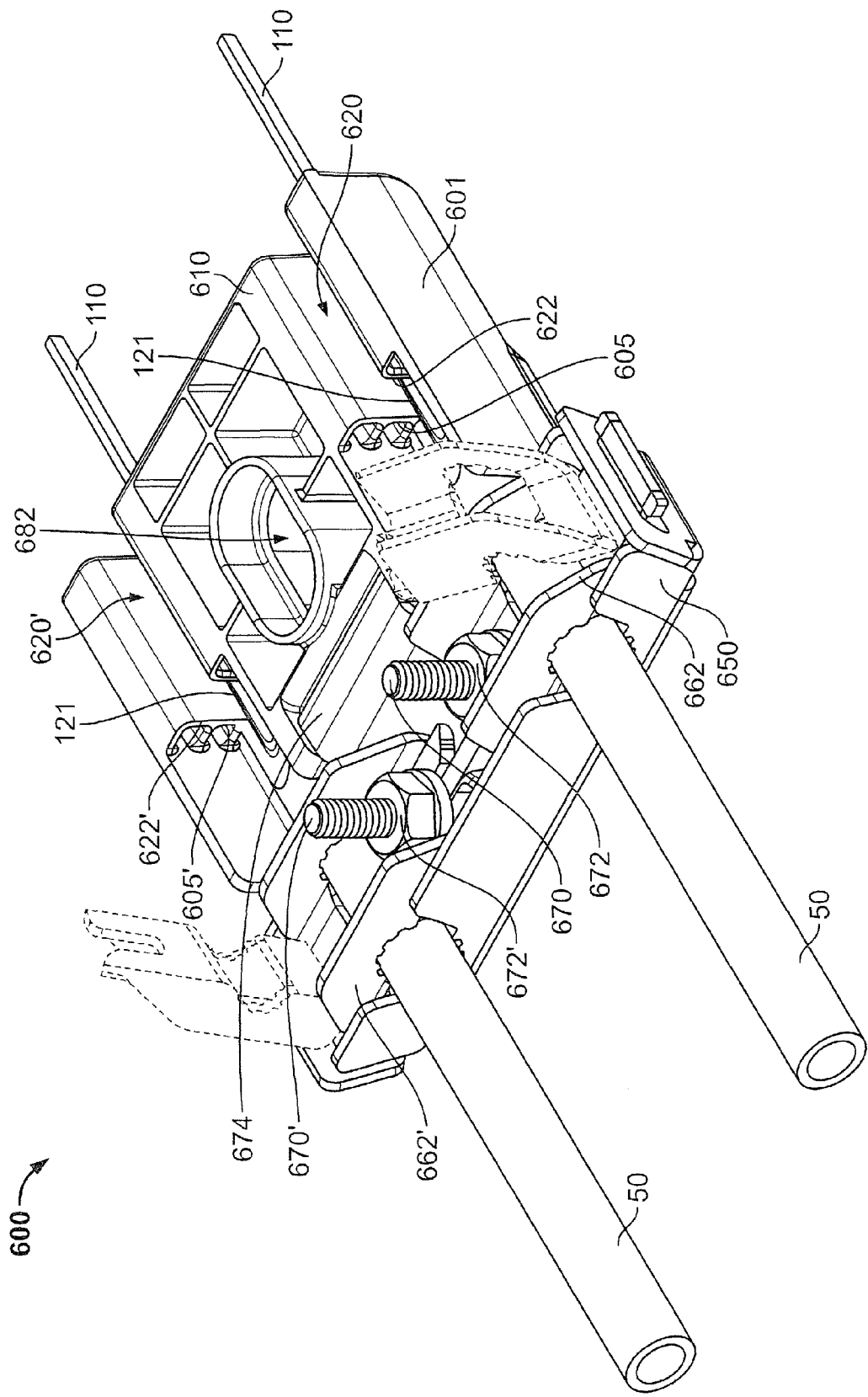

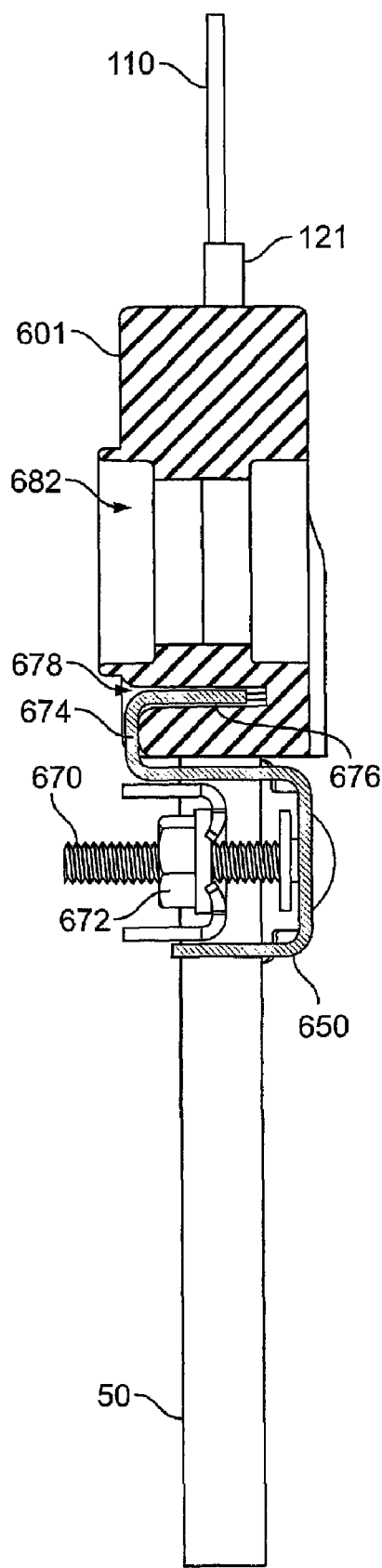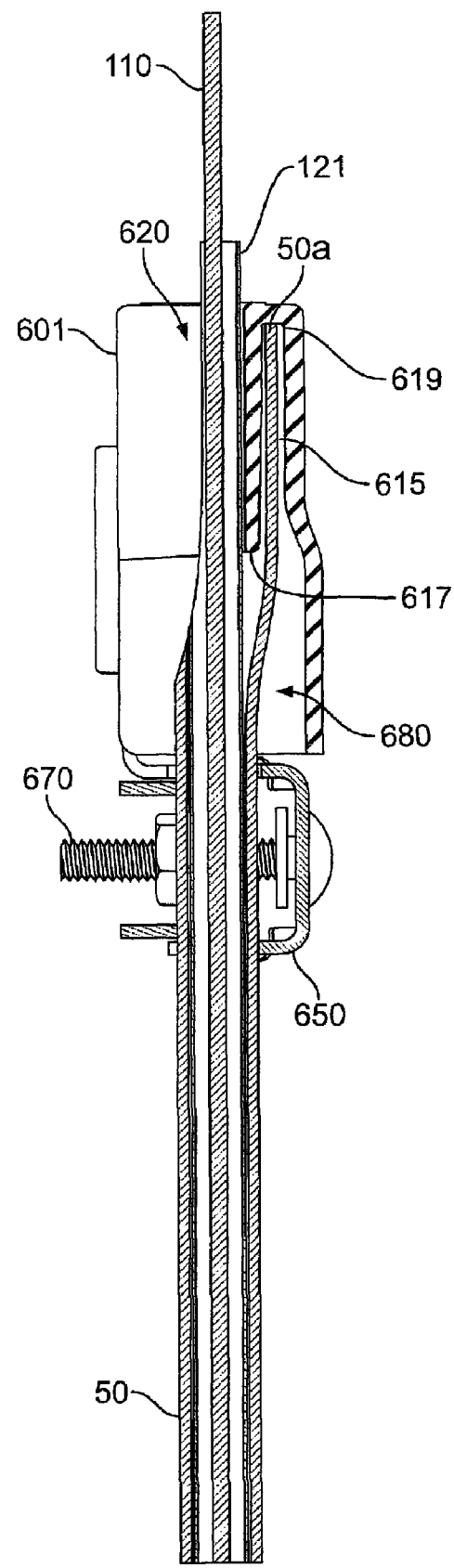
FIG. 6F
FIG. 6G

CABLE CLAMPING DEVICES AND METHODS FOR USING THE SAME

RELATED APPLICATION(S)

The present application is a continuation-in-part of co-pending U.S. patent application Ser. No. 12/535,946, filed Aug. 5, 2009, which claims the benefit of U.S. Provisional Patent Application No. 61/093,856, filed Sep. 3, 2008, and this application also claims the benefit of U.S. Provisional Patent Application No. 61/122,003, filed Dec. 12, 2008, the disclosures of which are hereby incorporated herein by reference in their entireties.

BACKGROUND OF THE INVENTION

The present invention relates to communication cable systems and, more particularly, to optical fiber clamping systems and methods for clamping optical fibers with the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location. A trunk or main cable may be routed, for example, through a housing subdivision and small fiber count "drop cables" may be spliced to the main cable at predetermined spaced apart locations.

A typical main cable may be installed underground and have multiple drop cables connected thereto, each of a hundred feet or more. Each of the drop cables, in turn, may be routed to an optical network unit (ONU) serving several homes. Information may then be transmitted optically to the ONU, and into the home, via conventional copper cable technology, although it also has been proposed to extend optical fiber all the way to the home rather than just to the ONU. Thus, the drop cables may serve groups of users, although other architectures may also employ a main cable and one or more drop cables connected thereto.

In addition to the optical fibers, a typical fiber optic cable may include cable jacketing material, cable strength members and fiber containment tubes. These three basic elements sometimes have different properties, such as different hardnesses, different stiffnesses, and different coefficients of thermal expansion. It may be desirable in many situations to limit or even prevent the cable jacketing and the cable strength members from axial displacement relative to one another, and/or relative to a cable enclosure or other device attached to the cable. A typical situation in which the securing is desired is where an opening has been made in the fiber optic cable for accessing the internal optical fibers, and where a splice enclosure may be installed.

In some existing systems, the securing of an accessed portion of a fiber optic cable may be achieved by first removing the cable outer jacket in order to expose some length of the strength members of the cable. The securing of the outer cable jacket is typically achieved by mechanically securing the outer cable jacket to a substrate at a location where the cable jacket is intact, i.e., outside of the region of the cable jacket that has been removed. This generally allows a circumferential clamp, such as a hose clamp or the like, to be tightened around the intact outer cable jacket, and then the clamp is attached to a substrate. In some cases, the clamp may be tightened around the full cable jacket and an extending element of the substrate so as to secure the cable outer jacket to the substrate. The cable strength element(s) are typically clamped in another clamp device, which is also attached to the substrate. This clamping may be achieved by various arrangements of screw actuated clamps and the like in order to bind down on and exert high forces upon the generally more rigid and harder strength member material. Thus, in combination, the clamping of the intact outer cable sheath to the substrate, and the clamping of the protruding exposed strength member(s) to the substrate can limit or even prevent displacement between the two, and can also serve as a means to jointly anchor the two to a device, such as a splice closure.

Generally, one reason for using two clamping mechanisms for the outer cable sheath and the strength members is that the cable jacket is relatively soft and, thus, usually requires a circumferential clamp that spreads the load over a surface area so as to avoid excessive point loading on the soft cable jacket material. The strength members are usually very hard materials, such as fiber glass or steel, and generally require much higher point loading to secure them sufficiently. These approaches generally require that the strength members be fully un-surrounded by the cable jacket materials (exposed) and protrude for some length in order to attach a clamp to them.

SUMMARY OF THE INVENTION

According to some embodiments of the present invention, a clamping device is provided for a fiber optic cable. The cable has a lengthwise cable axis and includes a plurality of optical fibers, a strength member and a jacket surrounding the optical fibers having a section thereof partially removed in a scalloped configuration that exposes an underlying section of the strength member while leaving a remaining portion of the jacket extending under the strength member. The clamping device includes a receiving block having a cavity extending longitudinally therein from an opening in an end face of the block to a closed end of the cavity. The cavity may be configured to receive the end of the remaining portion of the jacket and the strength member through the opening in the end face of the block. A coupling member is also included that is configured to couple the block to a portion of the jacket not having a section thereof partially removed when the strength member is inserted into the cavity to limit longitudinal movement of the block relative to the jacket and buckling of the strength member.

In other embodiments, the receiving block further includes a transition area extending longitudinally from the end face of the block that is configured to receive the plurality of optical fibers while limiting a bend radius of the optical fibers when they extend through the transition area. The transition area may be a sloped channel extending longitudinally through a portion of a second face of the block that extends transversely to and longitudinally from the end face. The transition area may include an opening in the end face extending from proximate the cavity to the second face.

In further embodiments, the coupling member includes a clamp member and a connecting arm. The clamp member is configured to clamp to the portion of the jacket not having a section thereof partially removed. The connecting arm extends between the clamp member and the receiving block. The clamp member and the connecting arm may be integrally formed. A screw may couple the receiving block to the connecting arm. The connecting arm may have a length selected to position the receiving block at a location proximate an end of the removed section selected to limit a length of the strength member exposed between the end of the removed section and the opening in the end face of the block to limit buckling of the strength member in the removed section.

In other embodiments, the cavity is a curved cavity sized to receive the remaining portion of the jacket and generally corresponding to a profile thereof. The receiving block may include a transition region extending from the end face of the receiving block to the coupling member configured to receive the end of the remaining portion of the jacket and direct the remaining portion of the jacket towards the opening when the remaining portion of the jacket is inserted into the cavity. The cavity may be a tapered cavity having a portion with a narrower width proximate the closed end of the cavity than at the opening to limit movement of the strength member relative to the remaining portion of the jacket to further limit buckling of the strength member proximate the closed end of the cavity. The curved cavity may have a circumferential length exceeding a circumferential length of the remaining portion of the jacket to accommodate expansion of the circumferential length of the remaining portion of the jacket when the remaining portion of the jacket is pressed into the portion of the cavity with a narrower width. The receiving block may also include a receiving channel configured to receive a mating retaining pin of a closure to attach the clamping device to the closure.

In further embodiments, the cavity is a first cavity and the receiving block further includes a second cavity configured to receive a remaining portion of a jacket of a second fiber optic cable. The coupling member is configured to couple the block to the portion of the jacket of the first cable not having a section thereof removed and to a portion of the jacket of the second cable not having a section thereof removed.

In other embodiments, the coupling member includes a base member and a clamp member. The base member is configured to receive the fiber optic cable. The clamp member is configured to be movably coupled to the base member and has an open position, allowing insertion of the fiber optic cable between the base member and the clamp member, and a closed position that secures the fiber optic cable between the base member and the clamp member. The clamp member may be pivotally coupled to the base member to allow movement of the clamp member in the open position to a shifted orientation allowing insertion of the fiber optic cable into the base member. The coupling member may further include a retaining bolt that fixedly couples the clamp member to the base member in the closed position and the base member may include a bolt receiving slot that receives the retaining bolt and allows lateral movement thereof relative to the lengthwise cable axis of the cable and a clamp member receiving slot on an end thereof displaced from the bolt receiving slot. The clamp member may include a retaining tab on a first end thereof that is configured to be pivotally received and retained in the clamp member receiving slot and a bolt receiving slot extending from an opposite end thereof that is configured to receive the retaining bolt when the clamp member is pivoted from the shifted orientation to a position proximate the fiber optic cable.

In yet other embodiments, the base member further includes a coupling tab and the receiving block further includes a mating coupling channel configured to slidably receive the coupling tab of the base member to attach the base member to the receiving block. The base member is a metal and the receiving block is a polymer. The coupling tab and the mating coupling channel may be configured to fixedly couple the base member to the receiving block when the coupling tab is fully inserted into the mating coupling channel. The receiving block may further include a receiving channel extending longitudinally from the end face of the block that has a curved bottom proximate the curved cavity.

In further embodiments, a closure device is provided for receiving a fiber optic cable, the cable having a lengthwise cable axis and including a plurality of optical fibers, a strength member and a jacket surrounding the optical fibers having a section thereof partially removed in a scalloped configuration that exposes an underlying section of the strength member while leaving a remaining portion of the jacket extending under the strength member to a longitudinal end of the remaining portion of the jacket and the strength member. The closure device includes an enclosure defining a splice chamber configured to accommodate splices to the plurality of optical fibers. The enclosure has a clamp receiving section therein. The closure device further includes a clamping device. The clamping device includes a receiving block having a cavity extending longitudinally therein from an opening in an end face of the block to a closed end of the cavity. The cavity may be configured to receive the end of the remaining portion of the jacket and the strength member through the opening in the end face of the block. The clamping device also includes a coupling member configured to couple the block to a portion of the jacket not having a section thereof partially removed when the strength member is inserted into the cavity to limit longitudinal movement of the block relative to the jacket and buckling of the strength member. The clamping device is configured to be removably inserted into the clamp receiving section of the enclosure. The clamp receiving section is configured to fixedly limit movement of the clamping device relative to the enclosure when the clamping device is installed therein to secure the remaining portion of the jacket and the strength member inserted in the cavity and abutting the closed end of the cavity to the enclosure.

In other embodiments, the clamping device further includes a receiving channel and the closure further includes a mating retaining pin. The receiving channel is configured to receive the mating retaining pin of the closure to attach the clamping device to the enclosure and fixedly limit movement of the clamping device relative to the enclosure.

In yet further embodiments, a method is provided for securing a fiber optic cable to a closure device using a clamping device including a receiving block and a coupling member. The method includes inserting the strength member into an opening in an end face of the receiving block. The receiving block includes a cavity extending longitudinally therein from the opening in the end face of the block to a closed end of the cavity and the strength member is inserted to a position proximate the closed end of the cavity. The coupling member is secured to a portion of the jacket not having a section thereof partially removed while the strength member is inserted into the cavity to limit longitudinal movement of the receiving block relative to the jacket and buckling of the strength member. The clamping device is inserted, with the strength member inserted in the cavity and proximate the closed end of the cavity, into the clamp receiving section of the closure device to secure the jacket and the strength member to the closure device and fixedly limit their movement relative to the closure device. The exposed plurality of optical fibers is positioned in a splice chamber of the closure device and the splice chamber is covered with the plurality of optical fibers therein.

Further features, advantages and details of the present invention will be appreciated by those of ordinary skill in the art from a reading of the figures and the detailed description of the preferred embodiments that follow, such description being merely illustrative of the present invention. All embodiments described herein can be combined in any way and/or combination.

BRIEF DESCRIPTION OF THE DRAWINGS

FIG. 6A is a perspective view of the clamping device according to other embodiments of the present invention.

FIG. 6F is a cross-sectional view taken along line 6F-6F of FIG. 6C.

FIG. 6G is a cross-sectional view taken along line 6G-6G of FIG. 6C.

DETAILED DESCRIPTION OF EMBODIMENTS OF THE INVENTION

Figure 1A:
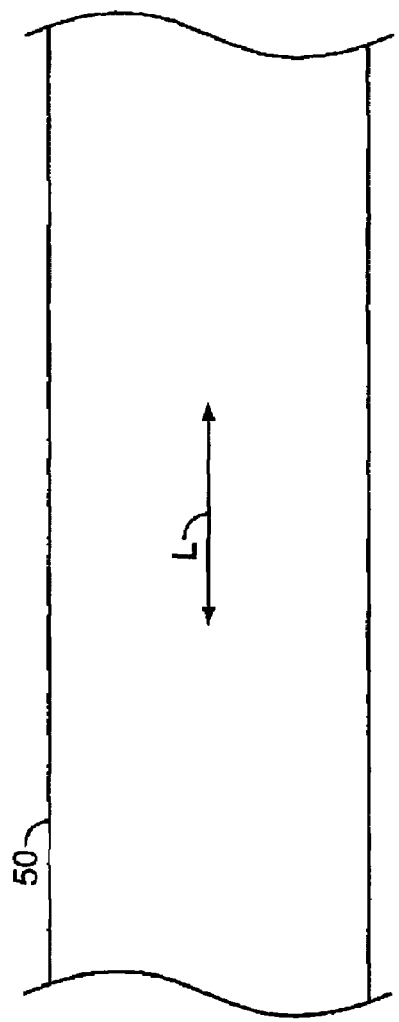
FIG. 1A is a cross-sectional view of a fiber optic cable before a scallop cut is formed.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

The description below references securing a portion of a fiber optic cable to a clamping device and securing the closure device with respect to the cable portion. The referenced fiber optic cables may include multiple optical fiber ribbons, a buffer tube, strength members, a jacket and a metal shield layer; however, according to other embodiments, fiber optic cables of other constructions (e.g., a fiber optic cable not having a metal shield layer) may be used with embodiments of the present invention.

As will be described further herein, some embodiments of the present invention provide devices configured to secure the individual elements of a fiber optic cable to each other, and to limit or even prevent them from moving relative to one another. Some embodiments of the present invention will now be described with reference to FIGS. 1A to 4C. The embodiments of FIGS. 3A to 4C may provide a clamping device configured to receive a severed end of a fiber optic cable and to limit or even prevent protrusion of the strength members of that cable.

Figure 1B:
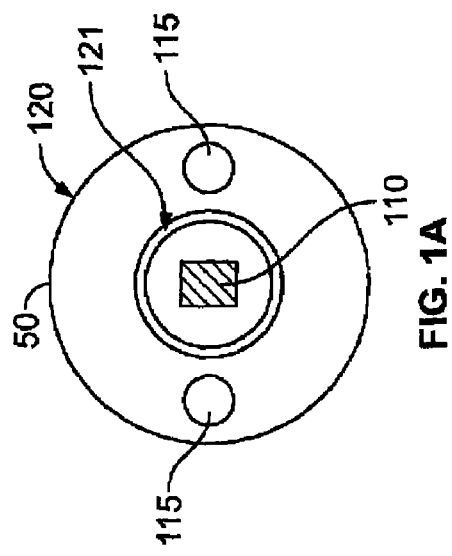
FIG. 1B is a side view taken of the fiber optic cable of FIG. 1A.
Figure 2A:
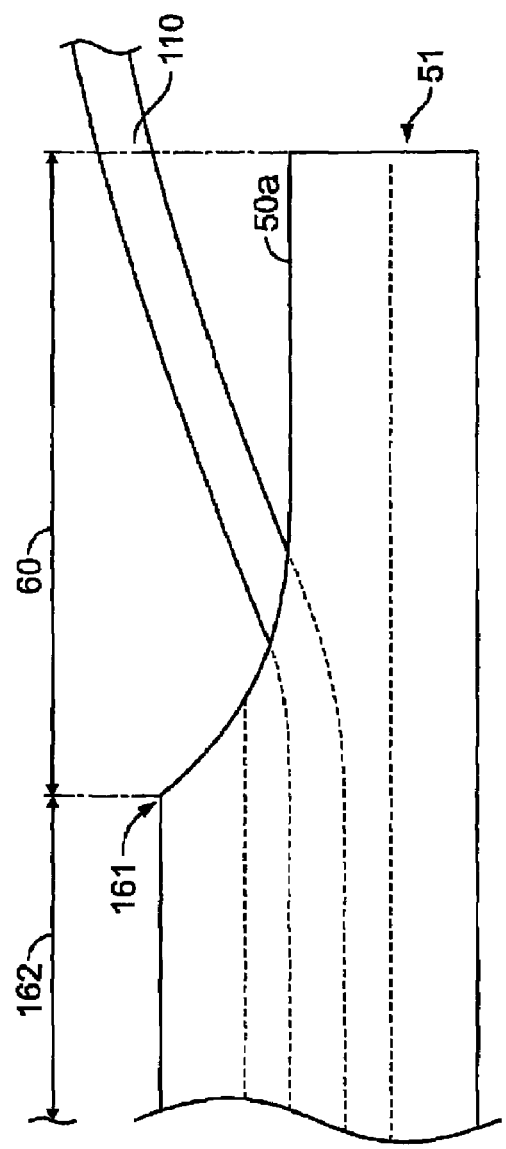
FIG. 2A is a cross-sectional view of the fiber optic cable of FIG. 1A after a scallop cut is formed according to some embodiments of the present invention.
Figure 2B:
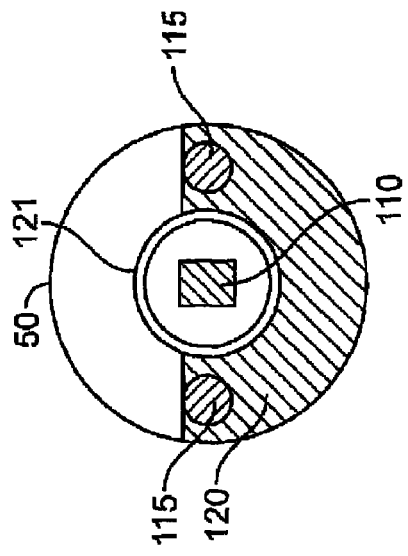
FIG. 2B is a side view of the fiber optic cable of FIG. 2A.

By way of background for the following description, FIGS. 1A and 1B illustrate an exemplary fiber optic cable 50 before a section thereof is removed in a scalloped configuration. FIGS. 2A and 2B illustrate the exemplary fiber optic cable 50 after the section 60 thereof is removed in a scalloped configuration. As seen in FIGS. 1A and 1B, in addition to optical fibers, shown as a stack of optical fiber ribbons 110, the illustrated fiber optic cable 50 includes cable jacketing material (cable jacket) 120, cable strength members 115, and fiber containment tube (buffer tube or central core tube) 121. These three components sometimes have different properties, such as different hardnesses, different stiffnesses, and/or different coefficients of thermal expansion. As discussed above, it is desirable in many situations to limit/prevent the cable jacket 120 and the cable strength members 115 from axial (longitudinal) displacement relative to one another, and/or relative to a cable enclosure or other device attached to the cable 50. A typical application in which the securing may be required is where an opening has been made in the fiber optic cable for accessing the internal optical fibers, and where a splice enclosure may be installed.

The fiber optic cable 50 is configured to be received in a cable securing device according to some embodiments as will be described with reference to FIGS. 2A and 2B. A section 60 of the cable outer jacket 120 and the central containment or buffer tube or central core tube 121 (which will be referred to herein generally as a buffer tube, which usage will include applications where the buffer tube may be referred to as a central core tube) is removed in a "scallop" configuration to allow access to the fiber(s) 110 inside, but such that a substantial remnant 50a of the cable jacket 120 (and buffer tube 121) may remain intact along with the strength member(s) 115. It will be understood that a "scallop" cut as used herein refers to a cut leaving a remaining portion of the jacket and the strength member(s) and is not limited to a particular profile of the angle of entry/exit at the beginning/end of the cut. In other words, a "scalloped" cut may have a sloped or substantially orthogonal angle of entry/exit. The scallop cut begins at an end 161 of the removed section 60 and ends at a cable end face 51 as illustrated in the side view of FIG. 2B. A section 162 of the cable 50 that does not have a section partially removed runs in the opposite longitudinal direction from the end 161. The outer cable jacket 120 and strength member(s) 115 are completely severed at cable end face 51, while the optical fiber(s) 110 remain uncut and accessible for splicing or the like when accessed at the section 60. As will be described herein, in some embodiments, the remaining portion 50a of the jacket is stripped from the strength member(s) before insertion of the strength members in a dead-end cavity. FIG. 2A shows an end view of the prepared cable 50 with the shaded area representing the severed cable end face 51. As described previously, fiber optic cables, such as the cable 50, may include additional and/or different features that will not be shown in the figures to facilitate the explanation of embodiments of the present invention herein.

Figure 3A:
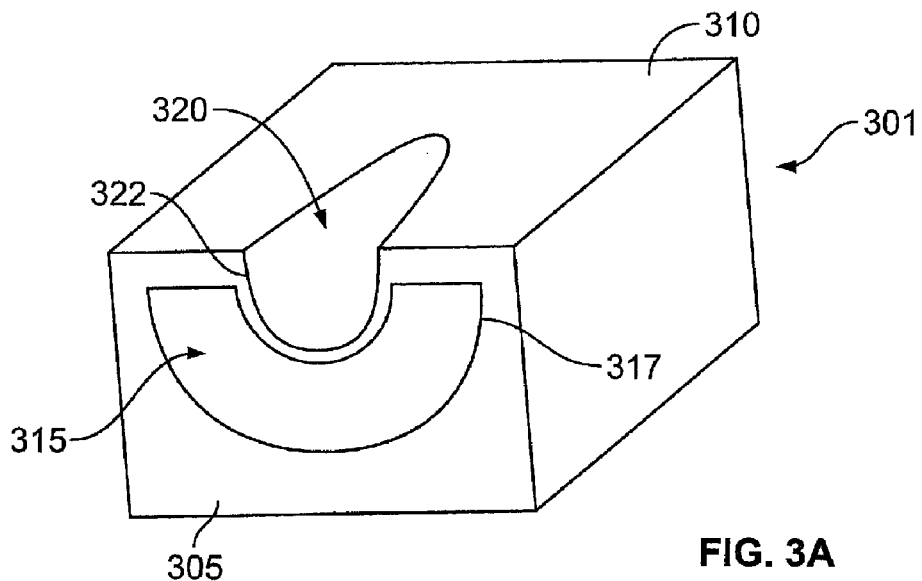
FIG. 3A is a perspective view of a clamping device according to some embodiments of the present invention.
Figure 3B:
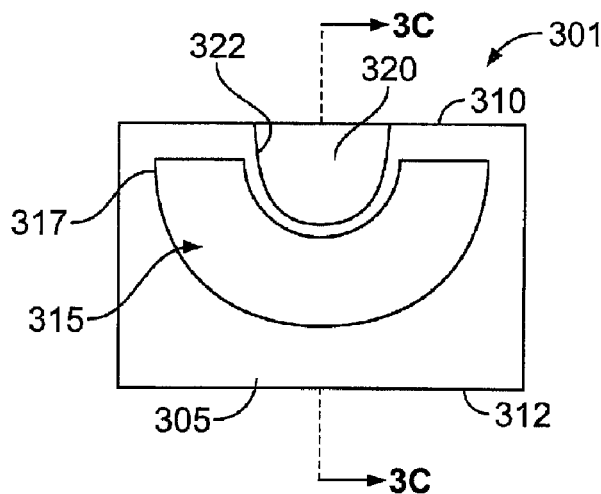
FIG. 3B is a front end view of the clamping device of FIG. 3A.
Figure 3C:
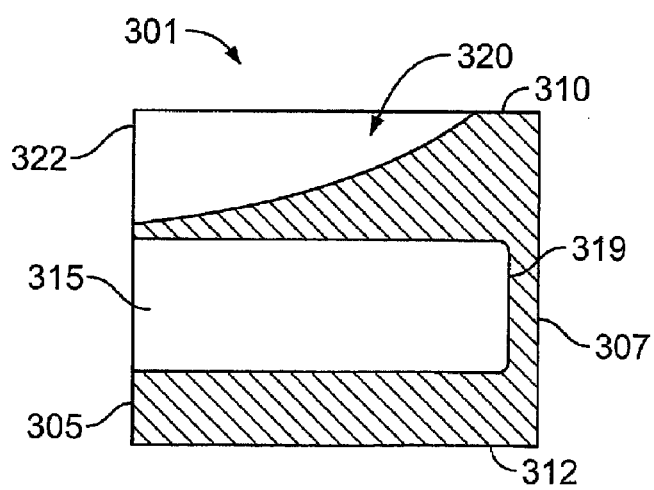
FIG. 3C is a cross-sectional view taken along line 3C-3C of FIG. 3B.

Referring now to FIGS. 3A-3C and FIGS. 4A-4C, a receiving block 301 for use in securing a fiber optic cable severed end will now be described. As seen in FIGS. 3A-3C, the receiving or "dead-end" block 301 includes a curved, approximately half round cavity 315 that is configured to receive the remaining portion 50a and strength member(s) 115 of a scalloped cut cable end. The receiving block 301 further includes a transition area 320 configured to receive the plurality of optical fibers 110 from the cable and which may facilitate a smooth transition of the fibers 110 from the cable opening formed by the scalloped cut and longitudinally past the vicinity of the block 301 without impingement (limiting a bend radius of the optical fibers when they extend through the transition area 320).

As further seen in FIG. 3A-3C, the cavity 315 extends from an opening 317 in a front end face 305 of the block 301 to a closed end 319 of the cavity 315. The closed end 319 of the cavity is proximate a back face 307 of the receiving blocks 301 longitudinally displaced from the end face 305 including the opening 317. As used herein, the end face 305 may be referred to as a front space while the end face 307 may be referred to as a back face with reference to how the remaining portion of the cable is inserted into the cavity 315. The cavity 315 is configured to receive the end 51 of the remaining portion 50a of the jacket 120 and the strength member(s) 115 through the opening 317 in the end face 305. The transition area 320 extends longitudinally from the end face 305 of the block 301 and, more particularly in the embodiments of FIGS. 3A-C is shown as a sloped channel extending longitudinally through a portion of an upper face 310 of the block 301 that extends transversely to and longitudinally from the end face 305 to the end face 307. The angle of the sloped channel in some embodiments may be from about 1° to about 20°. The transition area 320 includes an opening 322 in the end face 305 extending from proximate the cavity 315, and generally conforming to the curved shape thereof, to the upper face 310. Lower face 312 of the receiving block 301 is also shown that extends from the front face 305 to the back face 307.

Figure 4A:
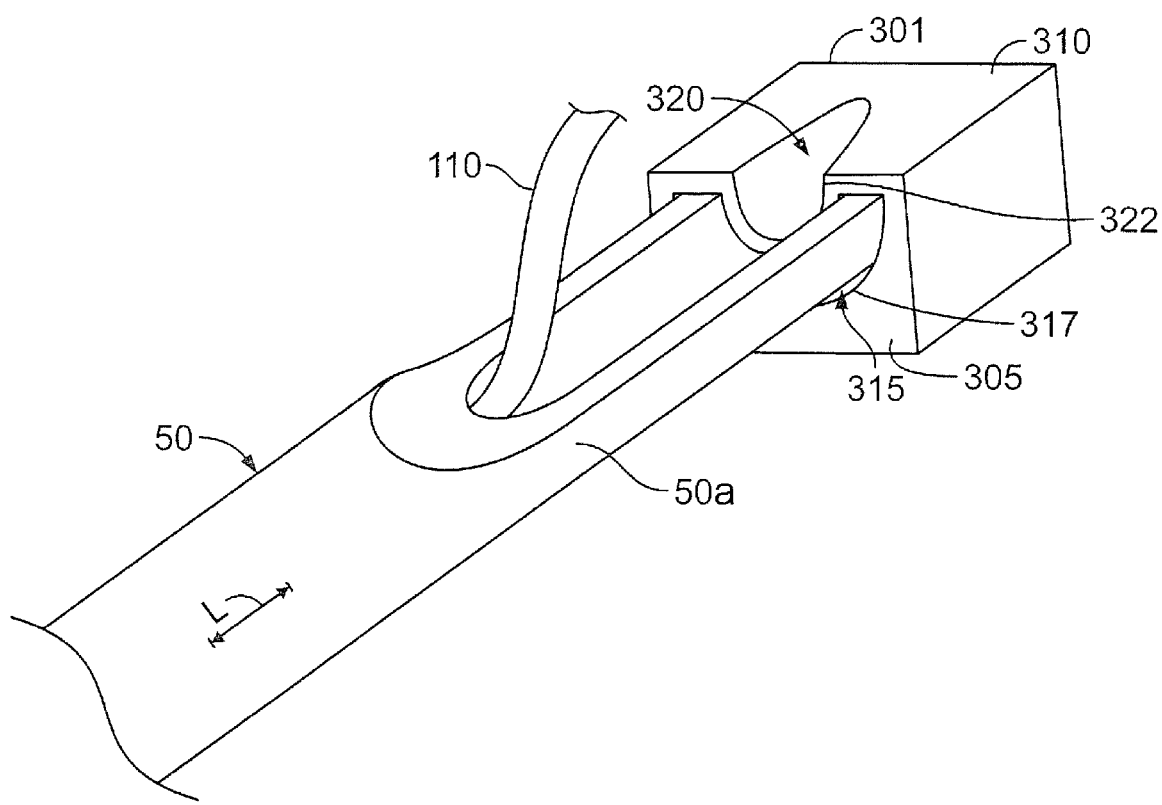
FIG. 4A is a perspective view of the clamping device of FIG. 3A with a fiber optic cable inserted therein.
Figure 4B:
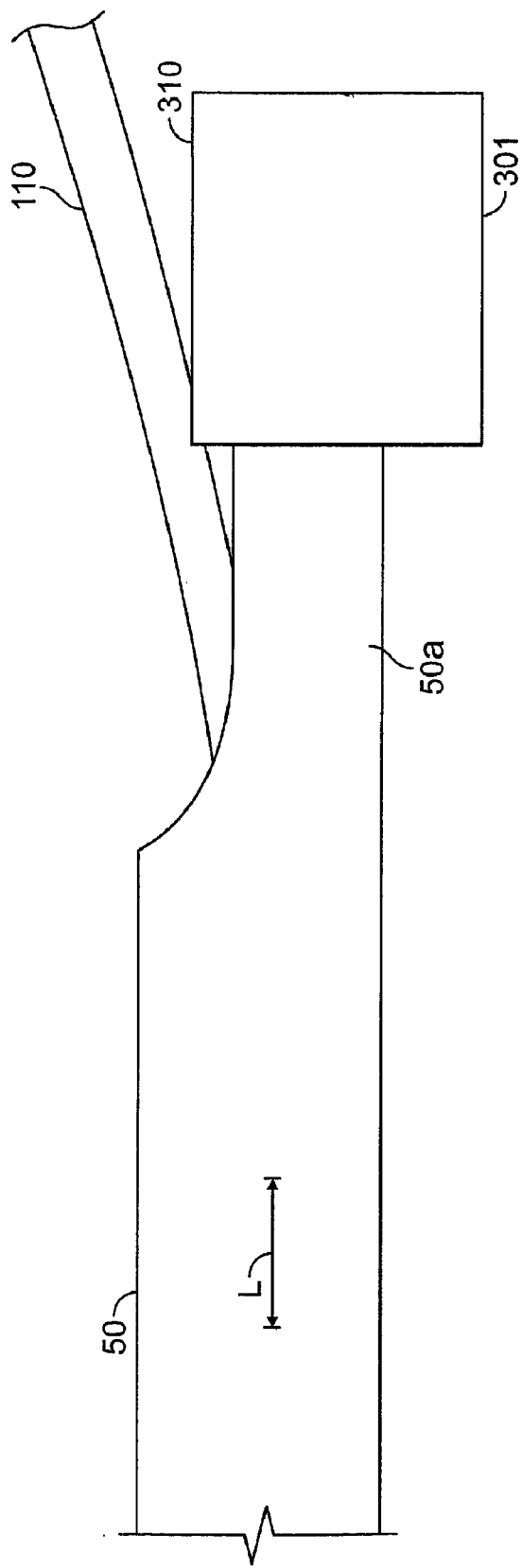
FIG. 4B is a side view of the clamping device of FIG. 4A.
Figure 4C:
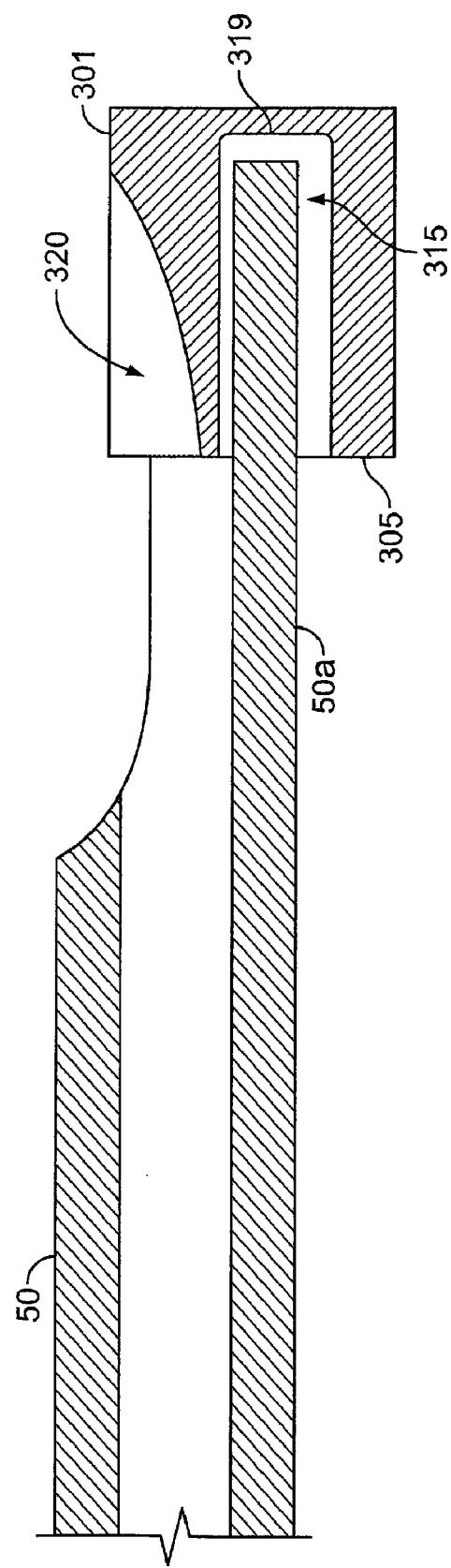
FIG. 4C is a cross-sectional view taken along the length of FIG. 4A.

Referring now to FIGS. 4A-4C, the receiving block 301 of the embodiments of FIGS. 3A-3C is shown with a remaining portion 50a of a cable 50 inserted therein. Note that FIG. 4C does not show the plurality of fibers (fiber ribbon cable) 110 for illustrative purposes and FIGS. 4A-4C do not show various other aspects of the cable 50, such as the strength member(s) 115, for ease of understanding. It will be understood that these and other components as described with reference to FIGS. 1A-1B and FIGS. 2A-2B may be present in various embodiments of the present invention.

Figure 5A:
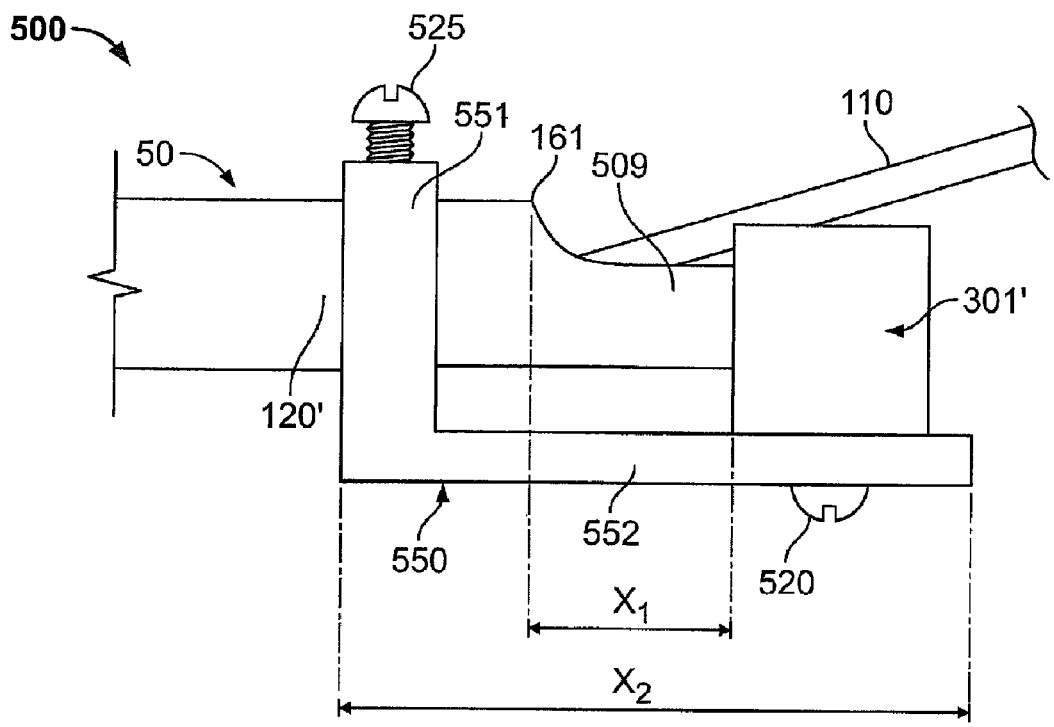
FIG. 5A is a side view of a clamping device for a fiber optic cable according to other embodiments of the present invention.

Referring now to the side view of FIG. 5A, embodiments of a clamping device 500 including a receiving block 301 configured substantially as described with reference to the receiving block 301 of FIGS. 3A-3C will be described. More particularly, FIG. 5A illustrates a clamping device 500 including a receiving block 301' and a coupling member 550 configured to couple the block 301' to a portion 120' of the jacket 120 not having a section thereof partially removed when the end 51 of the remaining portion 50a is inserted into the cavity 315 as seen in FIG. 5A. The coupling member 550 couples the receiving block 301' to the section 120' to limit longitudinal movement of the block 301' relative to the jacket 120 and buckling of the strength member(s) 115. In other words, the coupling member 550 grips the intact cable jacket 120 upstream of the severed end 51 to limit or even prevent the cable 50 from being pulled out of the receiving block 301'. As seen in the embodiments of FIG. 5A, the coupling member 550 includes a clamp member 551 including a screw 525, configured to claim to the portion 120' of the jacket 120 not having a section thereof partially removed and a connecting arm 552 extending between the clamping device 551 and the receiving block 301'. In the embodiments of FIG. 5A, the clamp member 551 and the connecting arm 552 are integrally formed. Also shown in the embodiments of FIG. 5A is a screw 520 that couples the receiving block 301' to the connecting arm 552.

In some embodiments, the connecting arm 552 has a length $X_2$ selected to position the receiving block 301' at a location proximate the end 161 of the removed section selected to limit a length $X_1$ of the strength member(s) 115 exposed between the end 161 of the removed section 60 and the opening 317 in the end face 305 of the block 301'. Such a sizing of the connecting arm 552 in relative positioning of the receiving block 301' on the remaining portion 50a and strength member(s) 115 may limit buckling of the strength member(s) 115 in the removed section 60.

Figure 5B:
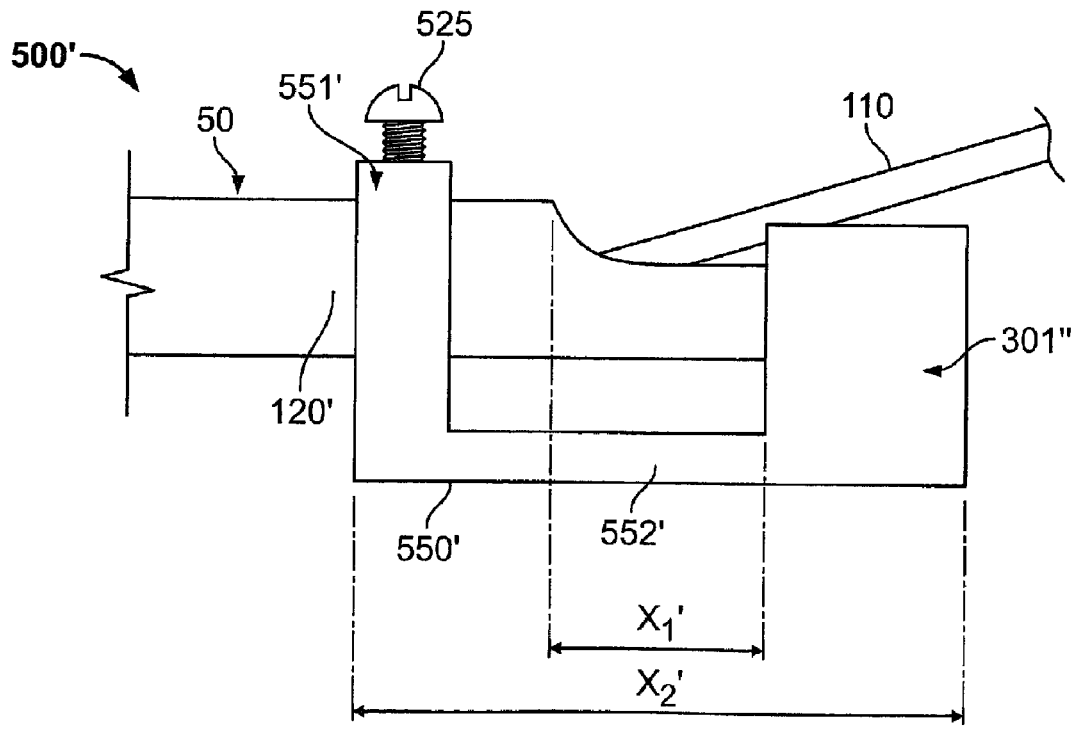
FIG. 5B is a side view of a clamping device for a fiber optic cable according to further embodiments of the present invention.

The like numbered references in the embodiments shown in the side view of FIG. 5B generally correspond to those described above with reference to the embodiments of FIG. 5A. The embodiments of FIG. 5B differ in the receiving block 301" is integrally formed with the clamping 550' and the connecting arm 552' rather than being coupled thereto using a screw 520 as with the embodiments of FIG. 5A. It will be understood, however, that the present invention is not limited to the illustrated combination and other embodiments may, for example, include a screw coupling the clamping device 550, 550' to the connecting arm 552, 552' rather than the components being integrally formed as shown in the embodiments of both FIGS. 5A and 5B.

Further embodiments of a clamping device 600 according to the present invention will now be described with reference to FIGS. 6A-6G. Like numbered items (e.g., 601, 301) in the embodiments of FIGS. 6A-6G conform to those items as described above with reference to the embodiments described with reference to FIGS. 3A-3B except to the extent they are otherwise described herein. Furthermore, the clamping device 600 described with reference to FIGS. 6A-6G is configured to receive two remaining scalloped portions of respective fiber optic cables 50 (which two cables may be respective upstream and downstream ends of a single fiber optic cable, i.e., ones of the plurality of optical fibers 110 may be express optical fibers entering in one of the illustrated cables 50 and exiting in the other). While two sets of features as described herein are provided in many cases, for each of the respective received cable 50 ends, like referenced items (e.g., 620, 620') are substantially identical except as described herein.

The illustrated embodiments of the clamping device 600 include a receiving block 601 and a coupling member 650. As with the previously described embodiments, the receiving block 601 includes an end face 605, 605' having an opening 617, 617' therein that is an opening to a curved cavity 615, 615'. As best seen in FIG. 6G, the cavity 615, 615' extends from the opening 617, 617' in the face 605, 605' to a closed end 619, 619'. The receiving block 601 further includes a receiving channel 620 extending longitudinally from the end face 605, 605' of the block 601. The receiving channel 620, 620' is configured to receive the plurality of optical fibers 110 and may further receive the buffer tube 121 as seen in FIGS. 6A, 6F and 6G. Note that in embodiments where it is desired to include the buffer tube 121 in the receiving channel 620, 620' rather than in the dead end cavity 615, 615' preparation of the scallop opened section of the cable 50 may include providing a segment of the buffer tube 121 extending longitudinally beyond the end 51 of the remaining portion to facilitate insertion of the buffer tube 121 into the receiving channel 620, 620'. However, it will be understood that, in other embodiments, the buffer tube 121 is not received along with the fibers 110 in the receiving channel 620, 620'. As also best seen in FIG. 6D, the illustrated receiving channel 620 has a curved bottom proximate the curved cavity 615, 615'. Thus, the receiving channel 620, 620' may, like the transition area 320 of the embodiments of FIG. 3A-3C, receive the optical fibers 110 while limiting a bend radius of the optical fibers when they extend through the receiving channel 620, 620'.

The illustrated embodiments of FIGS. 6A-6G further include a transition region 680, 680' extending from the end face 605, 605' of the receiving block 601 back upstream to the coupling member 650. The transition region 680, 680' is configured to receive the end 51 of the remaining portion 50a of the jacket 120 and direct the remaining portion 50a of the jacket 120 and the strength member(s) 115 towards the opening 617, 617' when the remaining portion 50a is being inserted into the cavity 615, 615'.

As best seen in FIG. 6G, in some embodiments, the cavity 615, 615' is a tapered cavity having a portion with a narrower width proximate the closed end 619, 619' of the cavity 615, 615' than at the opening 617, 617'. This configuration may limit movement of the strength member(s) 115 relative to the remaining portion 50a of the jacket 120 to further limit buckling of the strength member(s) 115 proximate the closed end 619, 619' of the cavity. Furthermore, the curved cavity 615, 615' may have a circumferential length exceeding a circumferential length of the remaining portion 50a of the jacket 120. As such, the curved cavity 615, 615' may accommodate expansion of the circumferential length of the remaining portion 50a of the jacket 120 when the remaining portion 50a is pressed into the portion of the cavity 615, 615' with a narrower width.

Also shown in the receiving block 601 of the embodiments of FIGS. 6A-6G is a receiving channel 682 used in retaining the receiving block in a closure as will be further described subsequently with reference to FIGS. 7A-7C.

Figure 6B:
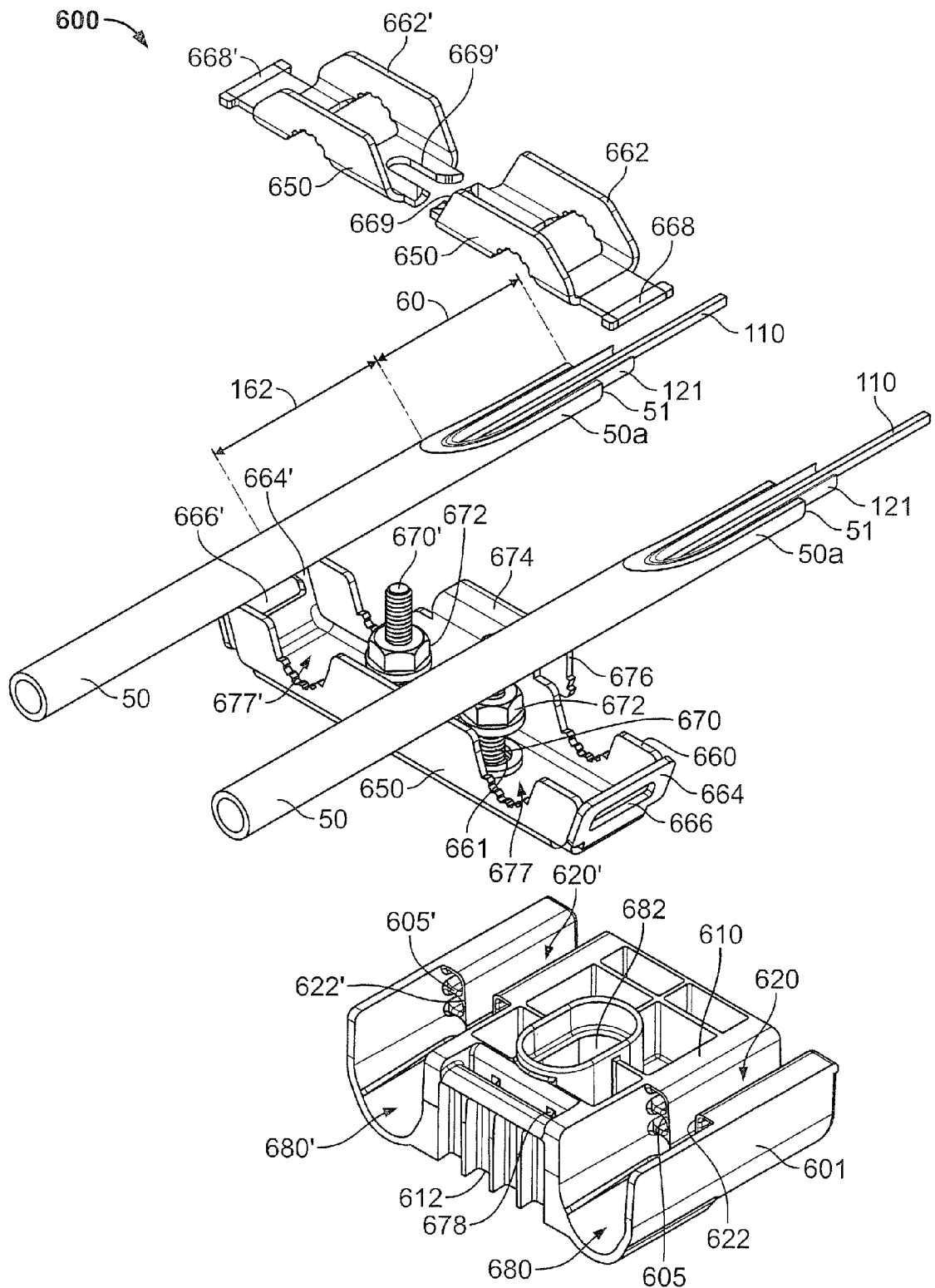
FIG. 6B is an exploded, perspective view of the clamping device of FIG. 6A.

As further seen in the illustrated embodiments of FIG. 6A-6G the coupling member 650 includes a base member 660 and clamp member(s) 662, 662'. The base member 660 is configured to receive the fiber optic cable 50, more particularly, an uncut portion thereof. More particularly, the base member 660 includes passage(s) 677, 677' sized to receive the cables 50. The clamp member(s) 662, 662' are configured to be movably coupled to the base member 660 and have an open position allowing insertion of the fiber optic cable(s) 50 between the base member 660 and the clamp member(s) 662, 662'. In a closed position as illustrated in FIG. 6A, the clamp member(s) 662, 662' secure the fiber optic cable 50 between the base member 660 and the clamp member(s) 662, 662'.

For the embodiments illustrated in FIG. 6A-6G, the clamp member(s) 662, 662' are coupled to the base member 660 to allow movement of the clamp member(s) 662, 662' in the open position to a shifted orientation allowing insertion of the fiber cable(s) 50 into the base member 660 in the channel 667, 677'. The shifted orientation is illustrated by the dotted line version of clamp member(s) 662, 662' in FIG. 6A. More particularly, the base member includes a clamp member receiving slot(s) 666, 666' therein and the clamp member(s) 662, 662' include a retaining tab 668, 668' at an end thereof that is configured to be pivotably received and retained in the clamp member receiving slot(s) 664, 664'.

Figure 6C:
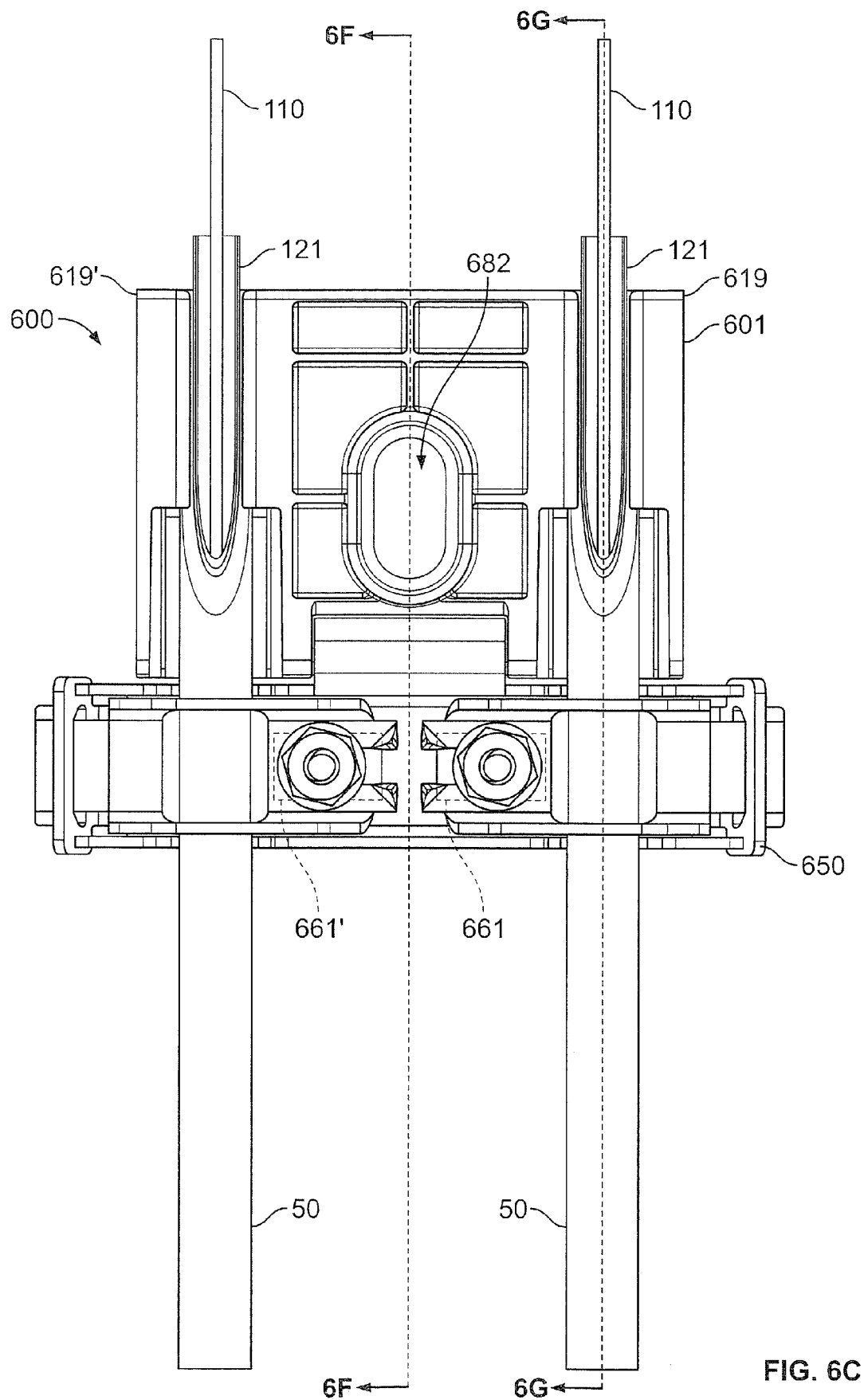
FIG. 6C is a top view of the clamping device of FIG. 6A.
Figure 6D:
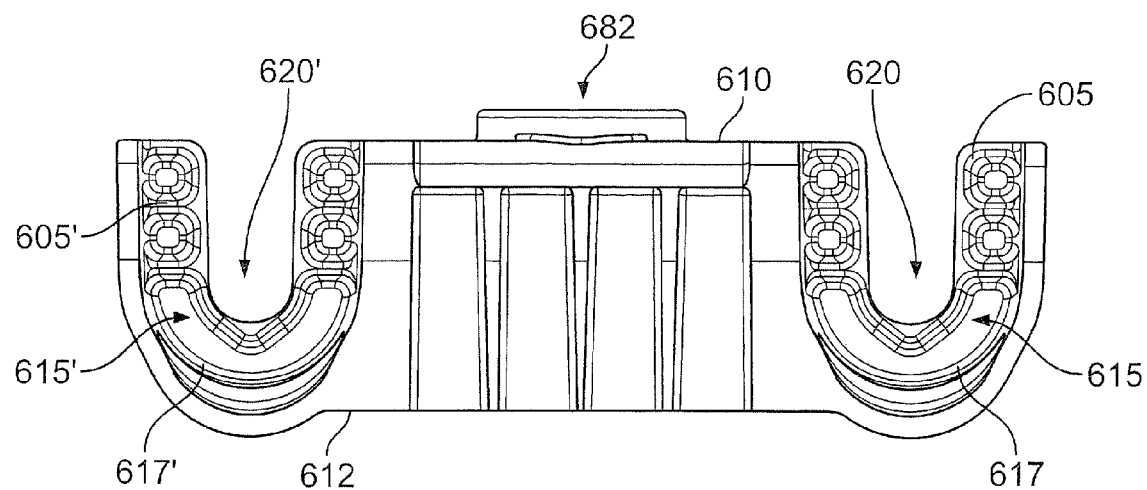
FIG. 6D is a front end view of the receiving block of the clamping device of FIG. 6A.
Figure 6E:
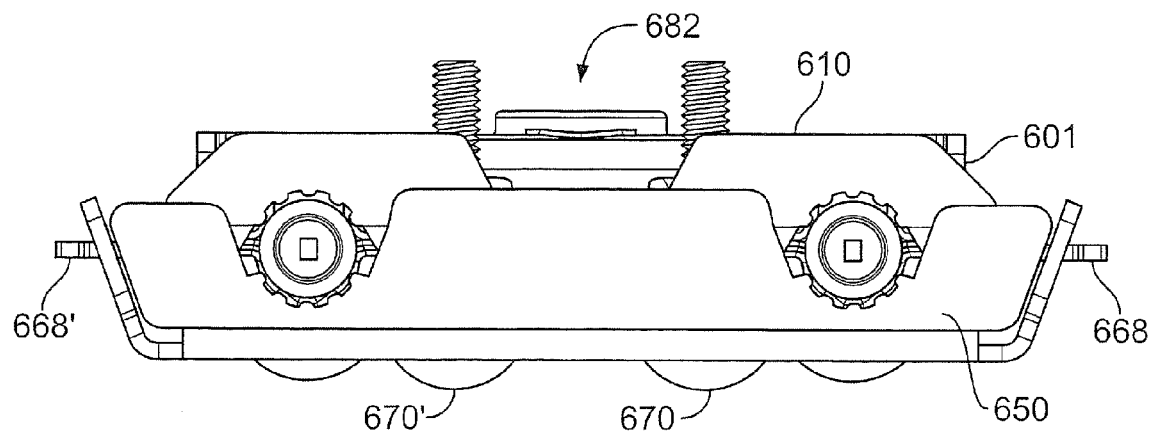
FIG. 6E is a front end view of the clamping device of FIG. 6A.

As also seen in FIG. 6A-6G, the illustrated embodiments of a clamping device 600 include retaining bolt(s) 670, 670' as part of the coupling member 650 that fixedly couple the clamp member(s) 662, 662' to the base member 660 in the closed position. In addition, the illustrated base member 660 includes a bolt receiving slot(s) 661, 661' that receive the retaining bolt(s) 670, 670' so as to allow lateral movement thereof relative to the lengthwise cable access L of the cable 50. Nut(s) 672, 672' coupled to the bolt(s) 670, 670' are also shown. As best seen in FIG. 6C, by the dotted line hidden portion of the receiving slot(s) 661, 661', the bolt(s) 670, 670' may be shifted inwards relative to the cables 50 and back out again within the slot(s) 661, 661'. The clamp member(s) 662, 662' contain a corresponding bolt receiving slot 669, 669' on an end thereof opposite the retaining tab(s) 668, 668' extending from the end thereof that is configured to receive the retaining bolt(s) 270, 270' when the clamp member(s) 662, 662' is pivoted from the shifted orientation to a position proximate the fiber optic cable(s) 50. Respective configurations of the receiving slot(s) 661, 661' and the retaining tab(s) 668, 668' provide a greater clearance flexibility for rotation of the clamp member(s) 662, 662' over the bolt 670, 670' to the closed position adjacent the cables 50.

As also seen in the embodiments of FIGS. 6A-6G, the base member 660 further includes a generally U-shaped coupling tab 674 and the receiving block 601 includes a mating coupling channel 678 that is configured to slidably receive the coupling tab 674 of the base member 660 to attach the base member 660 to the receiving block 601. As shown, the coupling tab 674 includes a serrated edge arm 676 that is received in the mating coupling channel 678 and the channel 678 is sized so that when the coupling tab 674 is received therein, the base member 650 is fixedly coupled to the receiving blocks 601.

A closure device 790 including a clamping device 600 as described above fixedly secured therein will now be described with reference to FIGS. 7A-7C. The illustrated closure device 790 includes an enclosure 792 that defines a splice chamber configured to accommodate splices to the plurality of optical fibers 110. The illustrated enclosure 792 includes a base enclosure portion 793 and a cover 791. The base portion 793 includes a clamp receiving section 794 therein. The base portion 793 further includes end seal members 795 that may be rotatably coupled to the remainder of the base portions 793 so they may be rotated into an open position allowing passage of the optical fiber cable(s) 50 into the opening(s) therein for sealing. The illustrated tool 798 may be used to rotationally drive components of the base portion 793 to provide a seal around the fiber optic cables 50 at the end of the enclosure 792 in a manner known in the art. The clamping 600 is configured to be removably inserted the clamp receiving section 794 of the enclosure 791, 793 and the clamp receiving section 794 is configured to fixedly limit movement of the clamping device 600 relative to the enclosure 791, 793 when the clamping device 600 is installed therein. As such, the clamping device 600 may secure the remaining portion 50*a* of the jacket 120 and the strength member(s) 115 inserted into the cavity 615, 615' and abutting the closed end 619, 619' of the cavity to the enclosures 792.

Figure 7A:
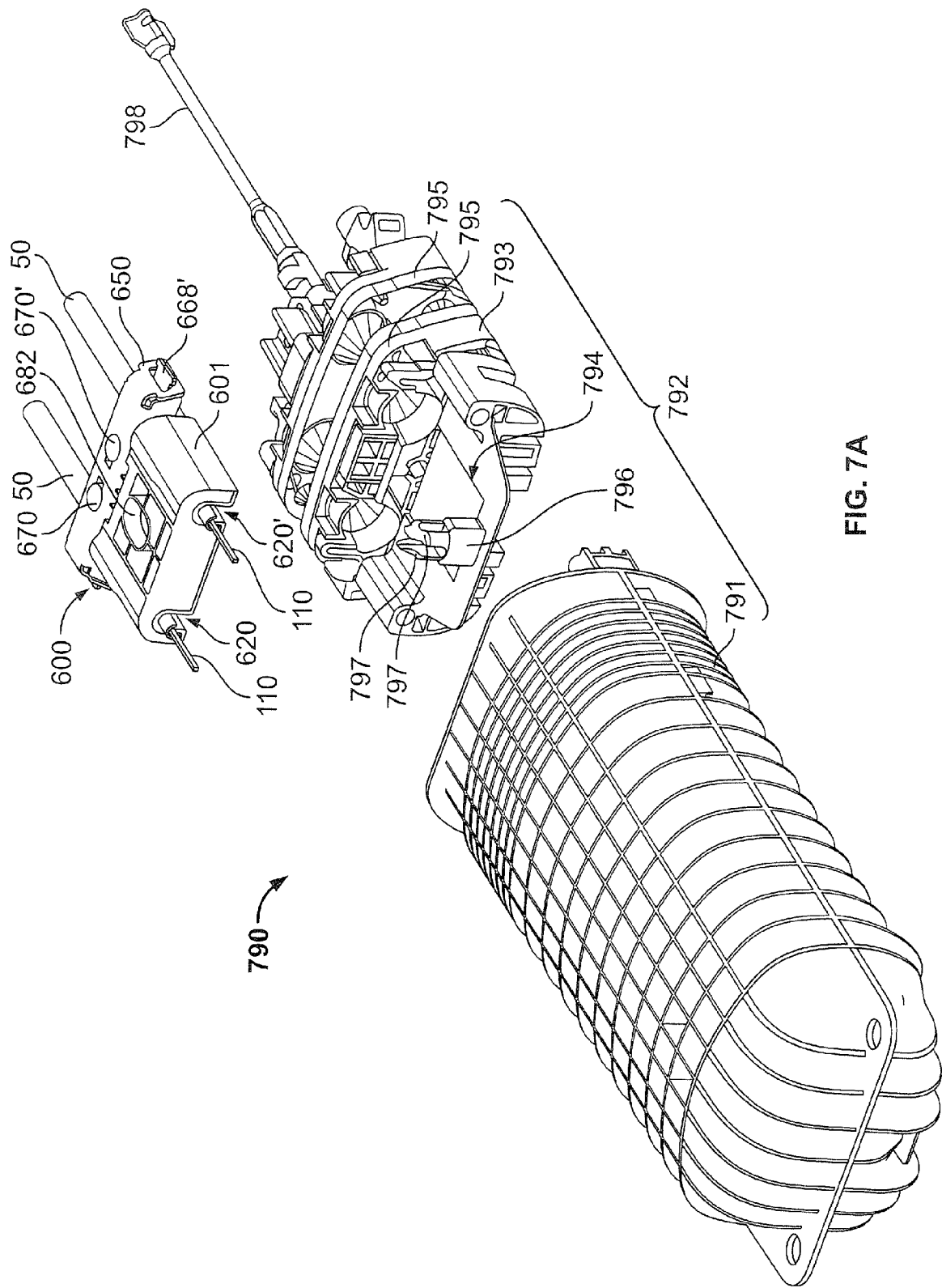
FIG. 7A is an exploded, perspective view of a closure device including the clamping device of FIG. 6A according to some embodiments of the present invention.
Figure 7B:
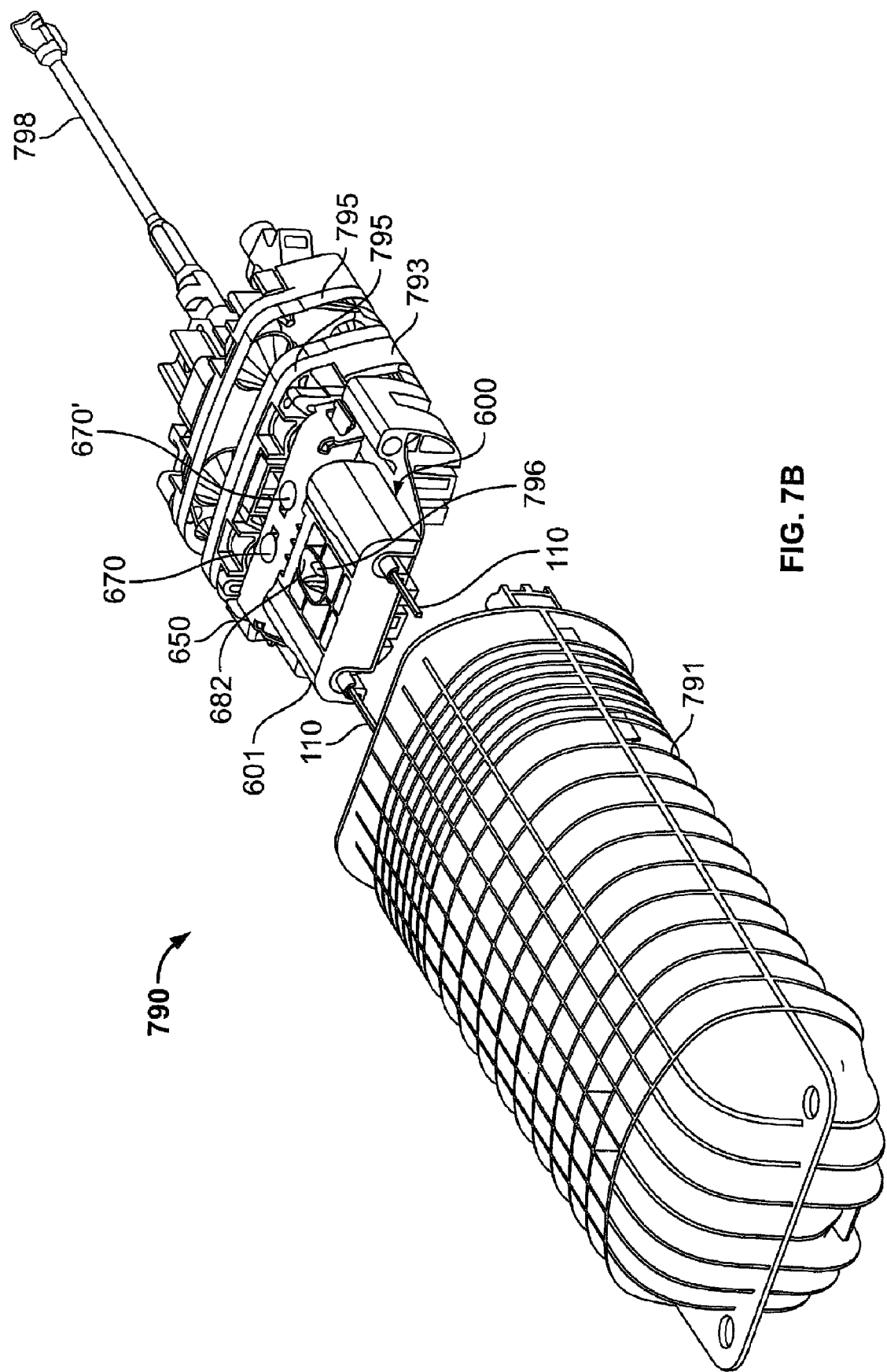
FIG. 7B is a partially exploded, perspective view of the closure device of FIG. 7A.
Figure 7C:
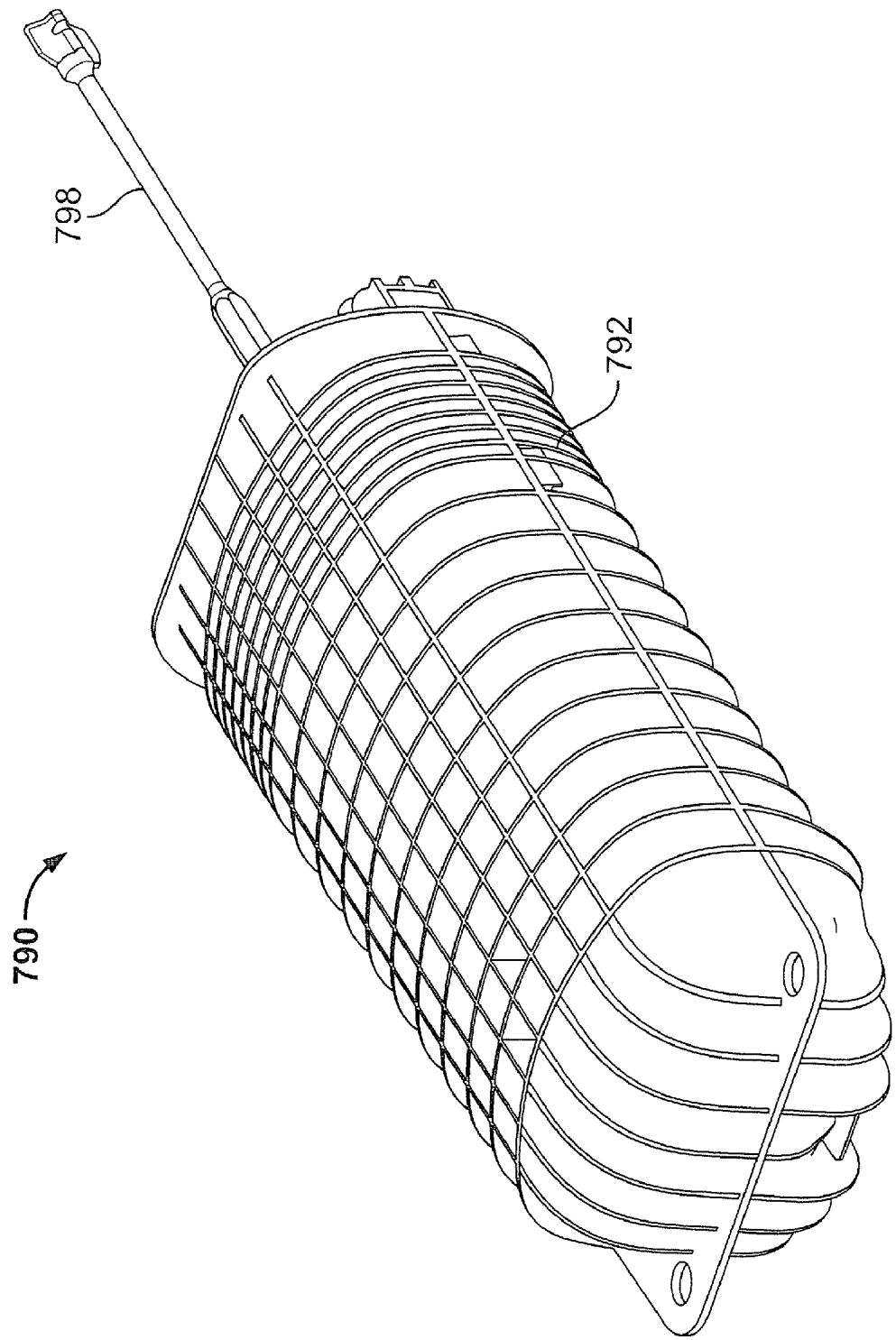
FIG. 7C is a perspective view of the closure device of FIG. 7A.

As more particularly illustrated in the embodiments of FIGS. 7A-7C and best seen in FIG. 7A, the clamp receiving section 794 includes a mating retaining pin 796. The mating retaining pin 796 is received in the receiving channel 682 of the clamping device 600 and fixedly limits the movement of the clamping device 600 relative to the enclosure 792. As seen in FIG. 7A, the mating retaining pin 796 includes movable tabs 797 thereon that are received in the receiving channel 682 and snap out to retain the clamping device 600 so that is cannot be readily pulled back out again. However, an operator with a tool or the like may press the tabs 797 towards each other to allow removal of the clamping device 600 from the base portion 793 when needed. In addition, when the cover 791 is fully installed as shown in FIG. 7C, the cover 791 also serves to limit movement of the clamping device 600.

An advantage of a cable securing device according to some embodiments of the present invention as described above is that the cable strength members may be limited or even prevented from telescoping out of the cut end of the cable as they are restrained within a cavity and have, at most, a limited ability to buckle. As such, the cable securing device may effectively constrain the cable and its strength members at an opening point without having to fully expose longer lengths of the strength members in order to place binding devices on the actual strength members themselves.

Figure 8:
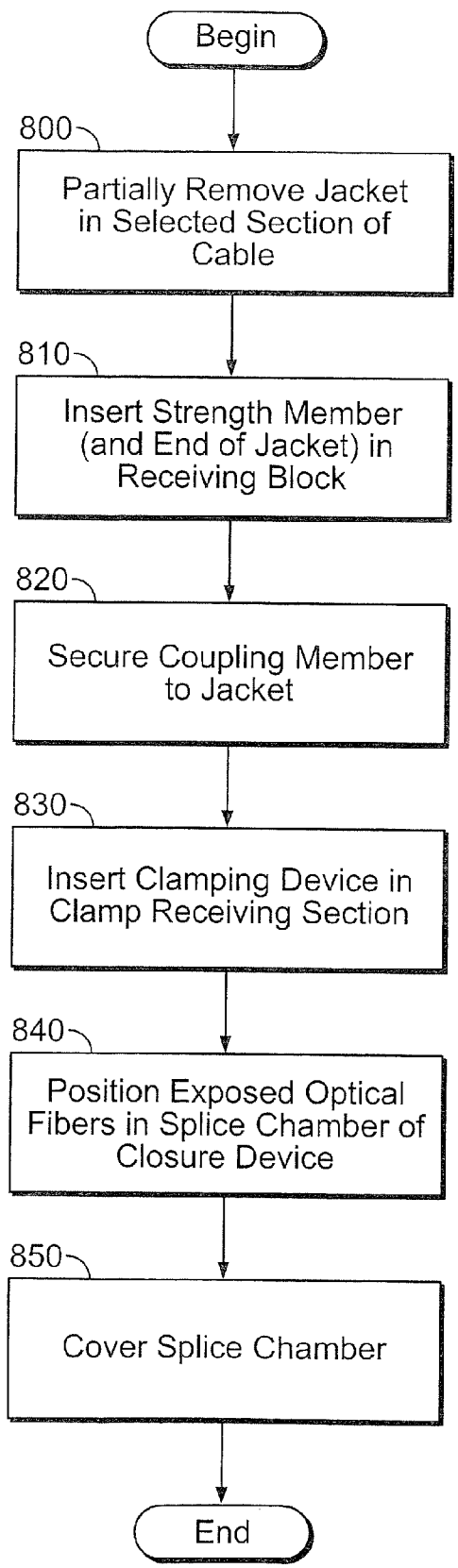
FIG. 8 is a flowchart illustrating operations for securing a fiber optic cable to a closure device according to some embodiments of the present invention.

Further methods for securing a fiber optic cable to a closure device will now be described with reference to the flowchart illustration of FIG. 8. Operations for some embodiments begin at Block 800 by partially removing the section of the jacket from the first end to a second, opposite lengthwise end to define a length of the section where the optical fibers will be accessed. The strength member(s) are inserted into an opening in an end face of a receiving block (Block 810). In some embodiments, the end of the remaining portion of the jacket and the strength member(s) are inserted at Block 810. The receiving block includes a cavity extending longitudinally therein from the opening in the end face of the block to a closed end of the cavity and the end of the remaining portion of the jacket and the strength member are inserted to a position proximate the closed end of the cavity. The coupling member is secured to a portion of the jacket not having a section thereof partially removed while the end of the remaining portion is inserted into the cavity to limit longitudinal movement of the receiving block relative to the jacket and buckling of the strength member (Block 820).

The clamping device, with the remaining portion of the jacket and the strength member inserted in the cavity and proximate the closed end of the cavity, is inserted into the clamp receiving section of the closure device to secure the remaining portion of the jacket and the strength member to the closure device and fixedly limit their movement relative to the closure device (Block 830). The exposed optical fibers are positioned in a splice chamber of the closure device (Block 840). The splice chamber is covered with the optical fibers therein (Block 850).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A clamping device for a fiber optic cable, the cable having a lengthwise cable axis and including a plurality of optical fibers, a strength member and a jacket surrounding the optical fibers having a section thereof partially removed in a scalloped configuration that exposes an underlying section of the strength member while leaving a remaining portion of the jacket extending under the strength member to a longitudinal end of the remaining portion of the jacket and the strength member, the clamping device comprising:

a receiving block having a cavity extending longitudinally therein from an opening in an end face of the block to a closed end of the cavity, wherein the cavity is configured to receive the end of the remaining portion of the jacket and the strength member through the opening in the end face of the block; and a coupling member configured to couple the block to a portion of the jacket not having a section thereof partially removed when the strength member is inserted into the cavity to limit longitudinal movement of the block relative to the jacket and buckling of the strength member.

2. The clamping device of claim 1, wherein the receiving block further comprises a transition area extending longitudinally from the end face of the block that is configured to receive the plurality of optical fibers while limiting a bend radius of the optical fibers when they extend through the transition area.

3. The clamping device of claim 2, wherein the transition area comprises a sloped channel extending longitudinally through a portion of a second face of the block that extends transversely to and longitudinally from the end face and wherein the transition area includes an opening in the end face extending from proximate the cavity to the second face.

4. The clamping device of claim 1, wherein the coupling member comprises:
a clamp member configured to clamp to the portion of the jacket not having a section thereof partially removed; and
a connecting arm extending between the clamping device and the receiving block.

5. The clamping device of claim 4, wherein the clamp member and the connecting arm are integrally formed.

6. The clamping device of claim 5, further comprising a screw that couples the receiving block to the connecting arm.

7. The clamping device of claim 4, wherein the connecting arm has a length selected to position the receiving block at a location proximate an end of the removed section selected to limit a length of the strength member exposed between the end of the removed section and the opening in the end face of the block to limit buckling of the strength member in the removed section.

8. The clamping device of claim 1, wherein the cavity comprises a curved cavity sized to receive the remaining portion of the jacket and generally corresponding to a profile thereof.

9. The clamping device of claim 8, further comprising a transition region extending from the end face of the receiving block to the coupling member configured to receive the end of the remaining portion of the jacket and direct the remaining portion of the jacket towards the opening when the remaining portion of the jacket is inserted into the cavity.

10. The clamping device of claim 9, wherein the cavity comprises a tapered cavity having a portion with a narrower width proximate the closed end of the cavity than at the opening to limit movement of the strength member relative to the remaining portion of the jacket to further limit buckling of the strength member proximate the closed end of the cavity.

11. The clamping device of claim 10, wherein the curved cavity has a circumferential length exceeding a circumferential length of the remaining portion of the jacket to accommodate expansion of the circumferential length of the remaining portion of the jacket when the remaining portion of the jacket is pressed into the portion of the cavity with a narrower width.

12. The clamping device of claim 11, wherein the receiving block further comprises a receiving channel configured to receive a mating retaining pin of a closure to attach the clamping device to the closure.

13. The clamping device of claim 12, wherein the cavity is a first cavity and the receiving, block further comprises a second cavity configured to receive a remaining portion of a jacket of a second fiber optic cable and the coupling member is configured to couple the block to the portion of the jacket of the first cable not having a section thereof removed and to a portion of the jacket of the second cable not having a section thereof removed.

14. A closure device including the clamping device of claim 9 fixedly secured in an enclosure with the end of the remaining portion of the jacket and the strength member inserted in the cavity and abutting the closed end of the cavity to limit movement of the cable relative to the enclosure.

15. A closure device kit including the clamping device of claim 9 and an enclosure having a clamp receiving section configured to receive the clamping device and fixedly limit movement of the clamping device relative to the enclosure when the clamping device is installed therein.

16. The clamping device of claim 8, wherein the coupling member comprises:
a base member configured to receive the fiber optic cable; and
a clamp member configured to be movably coupled to the base member and having an open position allowing insertion of the fiber optic cable between the base member and the clamp member and a closed position that secures the fiber optic cable between the base member and the clamp member.

17. The clamping device of claim 16, wherein the clamp member is pivotally coupled to the base member to allow movement of the clamp member in the open position to a shifted orientation allowing insertion of the fiber optic cable into the base member.

18. The clamping device of claim 17, wherein the coupling member further comprises a retaining bolt that fixedly couples the clamp member to the base member in the closed position and wherein the base member includes a bolt receiving slot that receives the retaining bolt and allows lateral movement thereof relative to the lengthwise cable axis of the cable and a clamp member receiving slot on an end thereof displaced from the bolt receiving slot and wherein the clamp member includes a retaining tab on a first end thereof that is configured to be pivotally received and retained in the clamp member receiving slot and a bolt receiving slot extending from an opposite end thereof that is configured to receive the retaining bolt when the clamp member is pivoted from the shifted orientation to a position proximate the fiber optic cable.

19. The clamping device of claim 17, wherein the base member further comprises a coupling tab and the receiving block further comprises a mating coupling channel configured to slidably receive the coupling tab of the base member to attach the base member to the receiving block and wherein the base member comprises a metal and the receiving block comprises a polymer.

20. The clamping device of claim 19, wherein the coupling tab and the mating coupling channel are configured to fixedly couple the base member to the receiving block when the coupling tab is fully inserted into the mating coupling channel.

21. The clamping device of claim 8, wherein the receiving block further comprises a receiving channel extending longitudinally from the end face of the block, the receiving channel having a curved bottom proximate the curved cavity.

22. A closure device for receiving a fiber optic cable, the cable having a lengthwise cable axis and including a plurality of optical fibers, a strength member and a jacket surrounding the optical fibers having a section thereof partially removed in a scalloped configuration that exposes an underlying section of the strength member while leaving a remaining portion of the jacket extending under the strength member to a longitudinal end of the remaining portion of the jacket and the strength member, the closure device comprising:
- an enclosure defining a splice chamber configured to accommodate splices to the plurality of optical fibers, the enclosure having a clamp receiving section therein; and
- a clamping device including:
  - a receiving block having a cavity extending longitudinally therein from an opening in an end face of the block to a closed end of the cavity, wherein the cavity is configured to receive the end of the remaining portion of the jacket and the strength member through the opening in the end face of the block; and
  - a coupling member configured to couple the block to a portion of the jacket not having a section thereof partially removed when the strength member is inserted into the cavity to limit longitudinal movement of the block relative to the jacket and buckling of the strength member,
  - wherein the clamping device is configured to be removably inserted into the clamp receiving section of the enclosure and wherein the clamp receiving section is configured to fixedly limit movement of the clamping device relative to the enclosure when the clamping device is installed therein to secure the remaining portion of the jacket and the strength member inserted in the cavity and abutting the closed end of the cavity to the enclosure.

23. The closure device of claim 22, wherein the clamping device further comprises a receiving channel and the closure further comprises a mating retaining pin and wherein the receiving channel is configured to receive the mating retaining pin of the closure to attach the clamping device to the enclosure and fixedly limit movement of the clamping device relative to the enclosure.

24. A method for securing a fiber optic cable to a closure device using a clamping device including a receiving block and a coupling member, the cable having a lengthwise cable axis and including a plurality of optical fibers, a strength member and a jacket surrounding the optical fibers having a section thereof partially removed in a scalloped configuration that exposes an underlying section of the strength member and the plurality of optical fibers while leaving a remaining portion of the jacket extending under the strength member to a longitudinal end of the remaining portion of the jacket and the strength member, the method comprising:
- inserting the remaining portion of the jacket and the strength member into an opening in an end face of the receiving block, wherein the receiving block includes a cavity extending longitudinally therein from the opening in the end face of the block to a closed end of the cavity and the remaining portion of the jacket and the strength member are inserted to a position, proximate the closed end of the cavity;
- securing the coupling member to a portion of the jacket not having a section thereof partially removed while the remaining portion of the jacket and the strength member are inserted into the cavity to limit longitudinal movement of the receiving block relative to the jacket and buckling of the strength member;
- inserting the clamping device with the remaining portion of the jacket and the strength member inserted in the cavity and proximate the closed end of the cavity into the clamp receiving section of the closure device to secure the jacket and the strength member to the closure device and fixedly limit their movement relative to the closure device;
- positioning the exposed plurality of optical fibers in a splice chamber of the closure device; and
- covering the splice chamber with the plurality of optical fibers therein.

* * * * *